March 3, 1953 — H. L. HANSON — 2,630,283
AUTOMATIC TERRAIN CLEARANCE APPARATUS
Filed Dec. 4, 1948 — 3 Sheets-Sheet 1
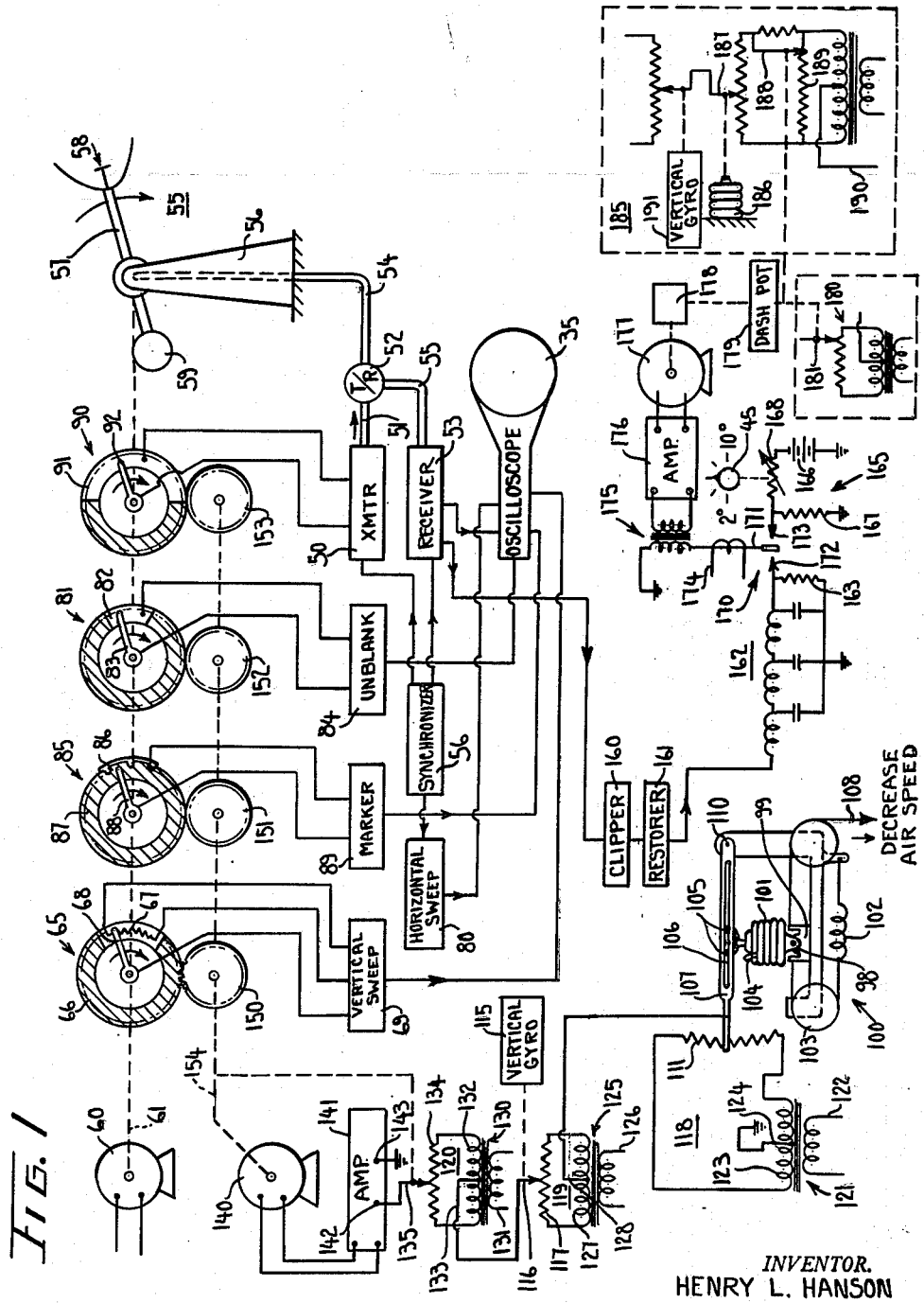
INVENTOR.
HENRY L. HANSON
BY
*George H Fisher*
ATTORNEY March 3, 1953  H. L. HANSON  2,630,283
AUTOMATIC TERRAIN CLEARANCE APPARATUS
Filed Dec. 4, 1948  3 Sheets-Sheet 2
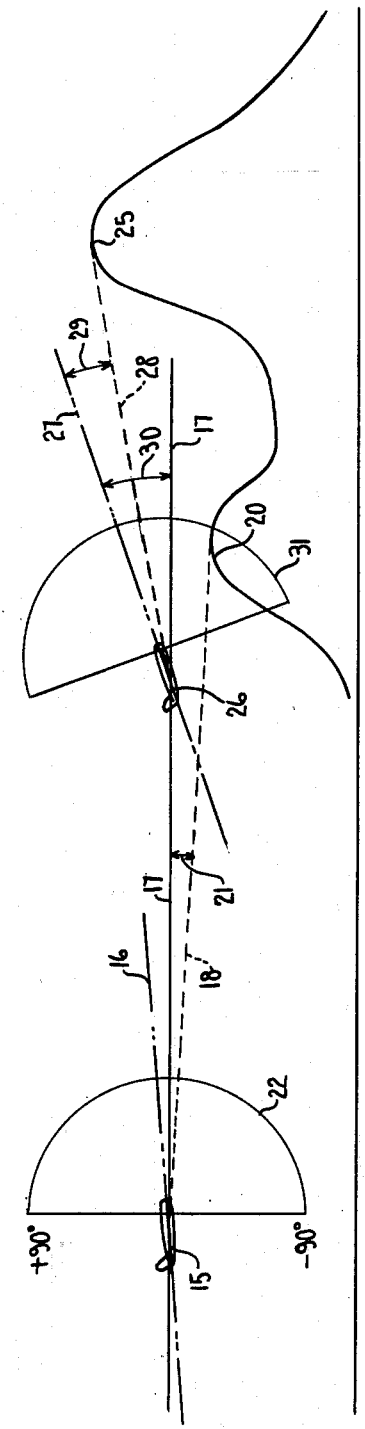
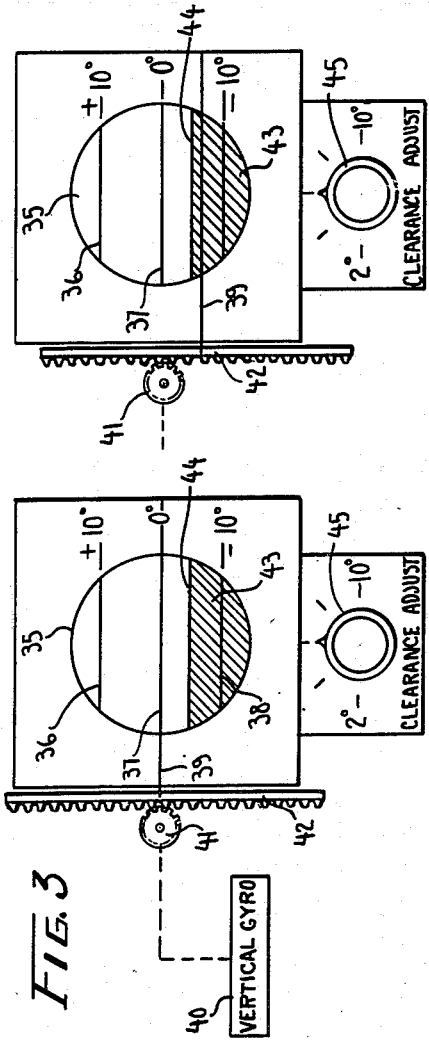
INVENTOR.
HENRY L. HANSON
BY George H Fisher
ATTORNEY March 3, 1953 H. L. HANSON 2,630,283
AUTOMATIC TERRAIN CLEARANCE APPARATUS
Filed Dec. 4, 1948 3 Sheets-Sheet 3
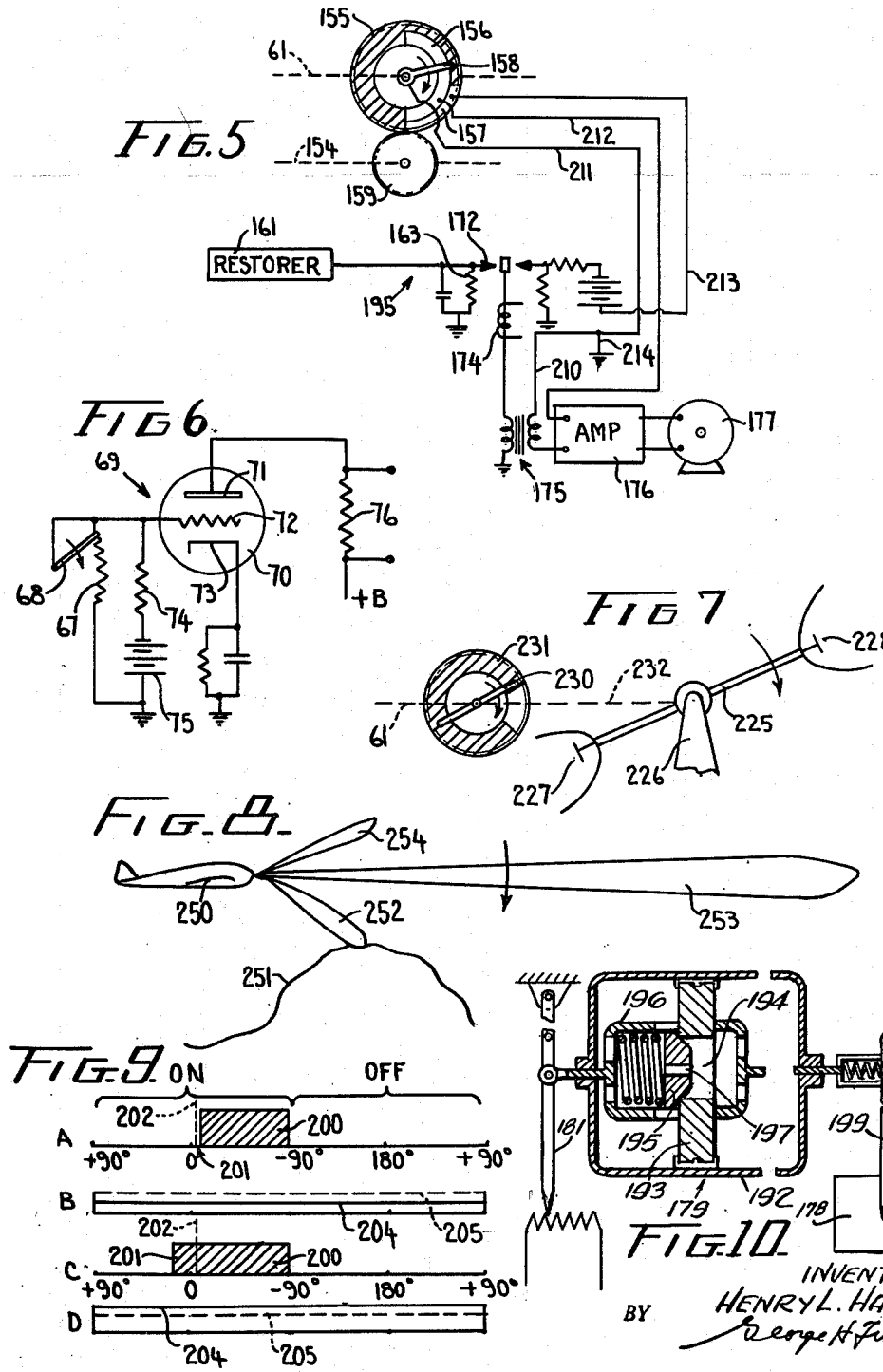
INVENTOR.
HENRY L. HANSON.
BY George H Fisher
ATTORNEY

UNITED STATES PATENT OFFICE 2,630,283

AUTOMATIC TERRAIN CLEARANCE APPARATUS

Henry L. Hanson, Minneapolis, Minn., assignor to Minneapolis-Honeywell Regulator Company, Minneapolis, Minn., a corporation of Delaware Application December 4, 1948, Serial No. 63,468

8 Claims. (Cl. 244—77)

The present invention is concerned with an apparatus for automatically causing a controlled craft to maintain a predetermined clearance with respect to obstacles located along the path of travel of the craft. The apparatus is more particularly concerned with an electromechanical apparatus for detecting the presence of obstacles along the path of the craft and automatically causing the craft to maintain a predetermined clearance with respect to those obstacles.

In present day aircraft, automatic controls have been provided for maintaining flight along a predetermined line of flight and for maintaining predetermined power outputs from the controlled craft so that constant air speeds may be maintained. While these craft are being controlled along a particular line of flight, there is always the possibility that unseen obstacles will be lying directly along the path of the craft. It is therefore desired that some apparatus be provided for making adjustments of the automatic power and flight control equipment to cause the craft to increase in altitude and avoid the obstacles.

The present invention contemplates accomplishing this automatic control by providing an apparatus which utilizes reflected electromagnetic waves for detecting the presence of obstacles and using the return electromagnetic waves for causing the craft to increase its altitude when the obstacles detected lie within a predetermined angle with respect to the line of travel of the craft.

It is therefore an object of the present invention to provide an apparatus for use with an aircraft having an automatic power control apparatus which will indicate the presence of obstacles lying along the path of the craft and will cause the craft to increase altitude and avoid the obstacles.

Another object of the present invention is to provide an automatic control apparatus for use with an aircraft having automatic flight control which will indicate the presence of an obstacle along the line of flight of the craft and will increase the angle of flight with respect to horizontal when an obstacle lies within a predetermined angle of the line of flight of the craft.

A further object of the present invention is to provide an automatic control apparatus for use with an aircraft having automatic flight control which will detect the presence of obstacles along the line of travel of the craft and will cause a relatively fast adjustment of the flight control apparatus in an increasing direction when an obstacle is present and a relatively slow decreasing control when the obstacle is no longer within a predetermined angle with respect to the line of flight of the craft.

Still another object of the present invention is to provide a terrain clearance apparatus which includes a signal radiating and receiving device for indicating the presence of terrain along the line of travel of the craft with the device rotating in a vertical plane and rendering that apparatus effective through a predetermined angle with respect to the line of travel of the craft.

Still another object of the present invention is to provide an automatic control device for a controlled craft which utilizes an electromechanical detecting apparatus for detecting obstacles along the path of the craft, operating the detecting apparatus through a predetermined angle with respect to the line of travel of the craft, and maintaining that angle about a center line which corresponds to the line of travel of the craft as determined by a device responsive to the angle of climb or descent of the craft.

A still further object is to provide an apparatus which will cause a controlled craft to avoid an obstacle when that obstacle lies within a predetermined angle with respect to the line of travel of the craft or when the obstacle lies within a predetermined distance from the craft.

These and other objects of the present invention will be understood upon a consideration of the accompanying specification, claims and drawings of which:

Figure 1 is a schematic showing of the subject control apparatus as it is associated with automatic flight control equipment of a controlled craft;

Figure 2 shows an elevational view of two aircraft approaching obstacles along their line of flight;

Figure 3 shows a visual indicator which indicates the presence of obstacles along the flight of the craft and the adjusting device for the apparatus;

Figure 4 shows the visual indicator of the apparatus when the aircraft is climbing to avoid an obstacle;

Figure 5 shows a modification of the apparatus disclosed in Figure 1;

Figure 6 shows one manner in which the vertical sweep for the indicating device may be obtained;

Figure 7 shows a modification of the antenna assembly and the switching assembly associated with the antenna;

Figure 8 shows one manner in which the antenna assembly may be designed so that the side lobes of the radiation pattern may be utilized in the operation of the control apparatus; and Figure 9 shows the control signals of the apparatus.

Figure 10 shows the structure of the dash pot shown schematically in Figure 1.

Referring first to Figure 2, the numeral 15 represents an aircraft which is flying along at a constant altitude. The longitudinal axis of this plane is indicated by line 16 while the line of travel of the craft is represented by the line 17 and corresponds to the horizon and is parallel therewith. The line 18 indicates the direct line between the aircraft 15 and the top of an obstacle 20. The angle between the lines 17 and 18, representing line of flight and line of clearance is actually the angle of clearance of the craft. This angle with respect to aircraft 15 is a positive angle. The numeral 22 represents the arc through which the automatic detecting apparatus, shown in Figure 1, is effective and this arc will always start at a position which is plus 90° with respect to the line of flight of the craft and will end at a position at a minus 90° with respect to the line of flight of the craft.

As the aircraft 15 flies toward the right, should it continue its present line of flight, the craft would fly directly into obstacle 25. To show the change that will be made upon the flight control equipment of the controlled craft when an obstacle lies along its path of flight, an aircraft 26 has been indicated. The line of flight of this craft has been indicated by the numeral 27 and the clearance line to the obstacle 25 has been represented by the line 28. The horizontal line 17 corresponds to the true horizon. The angle between the line of flight line 27 and the obstacle line 28 is the clearance angle 29 while the angle between the line of flight line 27 and the true horizon 17 is the actual angle of climb 30 of the aircraft 26. The numeral 31 represents the arc described by the obstacle detection apparatus and this arc has as a center line the line of flight line 27 and is also operating at a plus 90° with respect to the line of flight 27 to a minus 90° with respect to the line of flight 27.

Referring to Figure 3, there is shown the visual indicator for the pilot controlling the craft. This indicating device is in the form of an oscilloscope 35 which has generated thereon marker signals which are used to indicate the angle with respect to the line of travel of the craft. The line 36 represents the plus 10° viewing range with respect to the line of travel of the craft represented by the line 37 and which is indicated on the device by calibration mark at 0°. The line 38 represents the minus 10° marker signal which indicates visually the obstacles lying within the angle of a minus 10° with respect to the line of flight of the craft. The line 39 is actually a mechanical indicator which is movable across the face of the oscilloscope 35 by a vertical gyroscope 40 which acts through a pinion gear 41 and a rack 42 to position the indicator 39. The indicator 39 is positioned to correspond to the true horizon as determined by the vertical gyroscope 40. Obviously an electrical indication of true horizon could be given on the oscilloscope in a manner similar to the marker signals.

Figure 3 is a visual indication of the picture presented to the pilot flying in aircraft 15 where the true horizon and the line of flight of the craft correspond. The illuminated area of the oscilloscope 35, indicated by the numeral 43, corresponds to the location of the terrain with respect to the line of flight and true horizon. The top line of the illuminated area indicated by the numeral 44 is actually the location of the top of obstacle 20 and the distance between the line of flight line of the indicator as indicated by the numeral 37 and the top of the illuminated area 44 is the actual angle of clearance of the craft with respect to the obstacle 20. The adjusting knob 45 is provided for the pilot to manually determine the angle of clearance that is to be maintained by the automatic control apparatus shown in Figure 1.

Referring to Figure 4, this figure represents the visual indication that the pilot flying in aircraft 26 will have. In this case, the true horizon as represented by the indicator 39 will be below the line of flight line 37 and the distance between the lines 37 and 39 is a measure of the angle of climb of the craft. The top line of the illuminated area, as indicated by the numeral 44, actually indicates the top of the obstacle 25 and the distance between the line of flight line 37 and the line 44 is the actual angle of clearance of the craft should it continue along its projected line of flight.

Referring now to Figure 1, this figure represents the entire control apparatus as it is associated with the automatic controls of the associated craft. For indicating the presence of obstacles along the line of flight of the craft, a transmitter 50 is provided. This transmitter may be of any conventional type and should preferably be designed to operate in the UHF range in order that component sizes and associated equipment may be contained in a small space. The output of this transmitter is fed through an appropriate feed line 51 to a T/R device, indicated by the numeral 52. The transmitter 50 is of the pulsed type and each time the transmitter fires the T/R device will keep the transmitted signal out of a receiver 53. After the transmitted energy has passed through the T/R device 52, it passes through a further feed line 54 to an antenna assembly indicated by the numeral 55. This antenna assembly comprises a pedestal 56 which is fastened to a stationary position in the aircraft and serves as a pivot point and support for a rotating antenna 57. This rotating antenna 57 includes a radiating assembly 58 and a counterbalance 59. This antenna rotates in a clockwise direction when viewed from the right as the aircraft moves toward the right. The antenna is driven by a motor 60 coupled to the antenna 57 by appropriate connecting means 61. This antenna is effective through a range of plus 90° to minus 90° with respect to the line of flight of the craft and the manner in which this is obtained will be described later.

When an obstacle is detected, there will be a signal received by the radiating assembly 58 and this will in turn pass through the signal feed lines 54 and 55 to the receiver 53. This receiver will detect and amplify the received signal.

Coordinating the operation of the transmitter and receiver is a synchronizer unit indicated by the numeral 56, which synchronizer is the source of the pulsing signals for the transmitter 50 and the source of signals for limiting the range of the receiver 53 and maintaining the receiver inoperative while the transmitter is operating. The arrows on the drawing indicate the direction the control signal travels through the lines interconnecting the synchronizer and the transmitter and receiver.

For obtaining a visual indication of the terrain lying ahead of the craft and the line of flight of the craft, the oscilloscope 35 is provided. The vertical sweep for this oscilloscope is derived from a continuously rotating potentiometer assembly indicated by the numeral 65. This assembly includes a rotatable disc 66 which carries an associated slide-wire resistor 67. Also included in this assembly is a slider 68 which rotates at the same speed and in the same direction as the antenna 57. The slider 68 moving over the slidewire 67 serves to generate a sweep voltage in the vertical sweep circuits indicated by the numeral 69. Figure 6 indicates one manner in which the vertical sweep circuit may be designed. This figure, Figure 6, shows the sweep circuit to comprise an electron discharge device 70 having an anode 71, control electrode 72 and cathode 73. Located on the input of the discharge device 70 is a biasing circuit which includes a fixed resistor 74, the slider 68 and slide-wire 67 of the vertical sweep assembly 65, indicated in Figure 1. The direct current biasing source indicated by the numeral 75 normally maintains the discharge device 70 operating in a first range so that there will be a constant flow of current through the discharge device and a constant voltage drop across the load resistor 76. As the slider 68 moves from the upper end of slide-wire 67 to the lower end, the resistance of the voltage divider network on the input of this discharge device 70 will be changed so that the biasing voltage on the control electrode 72 will cause the current flow in the discharge device 70 to vary at a rate determined by the movement of the slider 58 over the slide-wire 67. This will mean that there will be a linear change in voltage drop across the load resistor 76 if there is a linear movement of the slider 68 and this change in voltage on the lead resistor is used to control the vertical sweep on the oscilloscope 35.

Referring back to Figure 1, the horizontal sweep circuits are represented in the block 80 and the operation of the horizontal sweep circuit is synchronized through the operation of the transmitter and receiver by the synchronizer unit 56. The horizontal sweep is so arranged that when there is a return signal indicating the presence of an obstacle in the viewing range of the scope, a bright line will appear across the entire face of the scope. A typical representation of the obstacle signal is as has been indicated by the area 43 in Figure 3.

In order to maintain the oscilloscope 35 operative through a predetermined angle of movement of the antenna 57, an unblanking switch assembly is provided. This switch assembly is indicated generally by the numeral 81 and comprises a switching surface 82 and a switch arm 83 which is rotating at the same speed as the antenna 57. The arcuate surface or the switch surface 82 is approximately 30°. This switching surface will operate appropriate circuits indicated by the numeral 84 and will apply an unblanking voltage to the oscilloscope 35 so that a viewing range of an area of 30° of the antenna rotation will be had upon the viewing screen of the oscilloscope 35.

To provide a marker signal for the scope 35, the marker switch assembly 85 has been provided and this includes a plurality of switch contacts 86 electrically interconnected upon the surface of the variably adjusted switch surface 87. A switch arm 88 rotates clockwise in the same manner as the antenna 57 and in the same speed as the antenna 57 and moves over the switch surface 87. Each time the slider 88 contacts one of the contacts 86, a pulse is generated and this is amplified through the circuits of the marker generator circuit 89 and fed to the control circuit for the oscilloscope 35 so that a bright line will appear upon the face of the scope each time the arm 88 contacts one of the contacts 86. These contacts are arranged so that the marker signal will appear at plus 10°, 0° and minus 10° with respect to the line of flight of the craft. A further switching surface is indicated by the numeral 90 and this is provided for turning the transmitter on and off. This switching mechanism includes a variable adjusted arcuate surface 91 and a switch arm 92 which is rotated at the same speed and in the same direction as the antenna 57. While the arm 92 is contacting the surface 91, the transmitter is operative and, with the arcuate surface 91 comprising 180° of the area of the surface, the transmitter will be operating through 180° of the rotation of the antenna 57. The position of the contact surface 91 is so adjusted that the transmitter will be operating when the antenna is moving through an arc from a plus 90° to a minus 90° with respect to the line of travel or flight of the craft.

In order to establish what the actual line of travel of the craft is, an angle of flight control is provided. This angle of flight control determines the actual angle at which the craft is approaching an oncoming obstacle and establishes a base line about which the apparatus operates. In other words, it is desired that the antenna be operative to detect the presence of obstacles through a range of plus 90° to minus 90° with respect to the line of travel of the craft regardless of whether the craft is traveling on a line parallel with respect to true horizon or if the craft is climbing to avoid an obstacle. Further, to enable the pilot to have an accurate visual indication of what the terrain in front of the craft is, it is necessary that a base line be established and this base line is indicated by the marker signal upon the oscilloscope with the 0° marker signal, as shown in Figure 3, corresponding to the line of flight of the craft. Further, it is desired that the vertical sweep circuit for the oscilloscope always be operative over a predetermined angle with respect to the line of travel of the craft.

The angle of flight is obtained by first obtaining a control signal which is representative of the angle of climb or descent of the aircraft. A device for obtaining such has been indicated by the numeral 100 and may be seen to comprise an air pressure responsive device in the form of a bellows 101 which is pivotally mounted at 98 on a pedestal 99 and is normally biased toward the left by a spring member 102 acting over a pulley assembly 103. This bellows 101 has a bleed 104 which tends to equalize the pressure on the inside and outside of the bellows. When the bellows has equal pressure inside and out, a pair of pins 105, which are adapted to move in a slot 106 in a slotted slide arm 107, will maintain the arm 107 in a neutral or central position as it is shown upon the drawing. These pins or rollers 105 will also maintain the bellows in a position to where it will act upon the arm 107 at right angles. The movement of the bellows and its associated base is accomplished by an air-speed device, not shown, which controls the tension on the spring 102 by the connecting means 108. A device capable of positioning the cable 108 is shown in a Reichel Patent 2,363,143, issued November 21, 1944. The high speed position of the bellows 101 and its associated base is toward the left and the low speed position is toward the right.

When the craft carrying the apparatus is maintaining a constant altitude, the bellows will be maintaining the pins 105 in their neutral position as well as arm 107 in its neutral position. Should there be an increase in altitude, the external pressure would tend to decrease faster than the internal pressure on the bellows and the result would be that the pins 105 will move in an upward direction and will cause bellows 101 to pivot clockwise to maintain the right angle relation between the bellows and arm 107. Since the arm 107 is pivoted at 110, the upward movement of the pins 105 would result in the upward movement of the outer end of the slider and this will vary the position of the slider 107 upon an associated slide-wire 111 in a balanceable electrical network which will be described below. For a given movement of the pins 105 by bellows 101, if the bellows and its base are located in the far left hand position, a relatively small adjustment will be made on the slider 107 over the slide-wire 111, however, if the bellows 101 and its base are moved to the extreme right hand position, as when there is a low speed, a relatively large adjustment will be made of the slider 107 over the slide-wire 111 with the same movement of pins 105. In other words, this apparatus combines air speed and rate of change of altitude to give an angle of climb or descent. The apparatus 100 thus forms a triangle for representing the angle of flight with the angle of displacement of the arm 107 from its normal position being determined by the rate of climb which is actually the length of the side opposite the angle of displacement in the subject triangle. The air speed of the craft sets up the hypotenuse of the triangle. Since both the rate of change of distance and altitude result in velocity signals, it is possible to obtain the angle of climb by using the altitude change and distance change in the triangle since a right angle relation is maintained between the bellows and arm 107.

In order to establish a reference signal for this angle of climb signal, a vertical gyroscope indicated by the numeral 115 is provided. This vertical gyroscope 115 positions a slider 116 over an associated slide-wire resistor 117. The angle of climb meter 100 and the vertical gyroscope 115 are actually operating sliders in a balanceable electrical network which balanceable electrical network includes three series connected networks 118, 119, and 120. The network 118 comprises a transformer 121 having a primary winding 122 and a secondary winding 123 tapped at 124. Connected to the end terminal of the secondary winding 123 is the slide-wire 111 associated with the angle of climb meter. The network 119 comprises a transformer 125 having a primary winding connected to the common source of power, not shown, and a secondary winding 127 which is tapped at 128. Connected to the end terminal of this secondary winding 127 is the slide-wire 117 which is associated with the vertical gyroscope 115.

The network 120 is the follow up network for the two previously described networks and includes a transformer 130 having a primary winding 131 connected to a source of power, not shown, and a secondary winding 132 which is tapped at 133. Connected to the end terminals of the secondary 132 is a slide-wire 134. Associated with this slide-wire 134 is a slider 135 which is variably positioned by a controlled motor 140.

Detecting the unbalance of these series connected circuits is an amplifier 141 and this amplifier may be of the type disclosed in the patent to Albert P. Upton, No. 2,423,534, issued July 8, 1947.

Considering the operation of this angle of flight control circuit it will first be noted that electrical networks 118, 119 and 120 are connected in series and this circuit then may be traced to the input of amplifier 141 as follows: the ground terminal connected to center tap 124 of the angle of climb meter network 118 through network 118, slider 107, tap 128, network 119, slider 116, tap 133, network 120, and slider 135 to the input terminal 142 of the amplifier 141 and from there to the ground terminal 143 of the amplifier. When all of the networks 118 through 120 are in the position shown upon the drawing, each of the individual electrical networks will be electrically balanced and the sum total of the voltages arising on the output terminals of each of these networks will be equal to zero.

This will mean the controlled motor 140 is not being energized by the amplifier 141. If the loading of the plane should be changed due to movement of passengers from one place to another in the fuselage, the vertical gyroscope will indicate the change in position of the longitudinal axis of the craft, as the vertical gyroscope uses the plane as its support. Assume that the tail of the craft should rise so that the longitudinal axis of the plane will change. Should the altitude of the craft remain constant, the only adjustment made in the electrical network will be the positioning of the slider 116 over the associated slide-wire 117 by the vertical gyroscope. This will create an unbalance in the electrical network 119. This electrical unbalance will be detected by the amplifier 141 and it will be operative to start the motor 140 rotating. The rotation of the motor 140 will result in the repositioning of the slider 135 over the slide-wire 134 and network 120. The repositioning of the slider 135 in network 120 will result in an unbalance in the network 120 which will be equal and opposite to the unbalance created by the movement of the vertical gyroscope as indicated by the slider 116 in network 119. This will mean that the electrical input to the amplifier 141 will be balanced and there will be no signal tending to cause further rotation of the motor 140.

The movement of the longitudinal axis of the craft in the direction opposite to the condition assumed will result in the vertical gyroscope unbalancing the electrical network 119 in the opposite direction and it will also result in the motor 140 repositioning the slider 135 and network 120 so that the unbalance in network 120 will be equal and opposite the unbalance of network 119 so that the series addition of the voltages going into the amplifier will result in no further rotation of the motor 140.

Should the craft be changing altitude, there will be a resultant adjustment of the slider 107 of the angle of climb meter 100. This will result in unbalance in the electrical network 118 and the direction of the unbalance will be detected by the amplifier 141 which will in turn cause rotation of the motor 140 in a direction to unbalance the network 120 in a direction opposite the unbalance of network 118. The magnitude of unbalance in network 120 will be equal to the unbalance in network 118 and motor 140 will no longer rotate. When the craft is no longer changing altitude, the slider 107 will return to the neutral position and there will be no unbalance in the network 118. This will mean that the unbalance created by movement of the motor 140 and the repositioning of slider 135, when there was a changing altitude, will have to be removed and this unbalance in network 120 will be detected by the amplifier 141 and the motor 140 will move the slider 135 back to a position where the input to the amplifier no longer indicates an unbalance in the series connected networks.

While the motor 140 is maintaining the series connected networks balanced, it is also changing the position of the switching surfaces associated with the detection and indicating circuit. Each of the surfaces 66, 87, 82 and 91 are variably positioned by a plurality of gears 150, 151, 152, and 153. These gears are all connected directly to the motor shaft of motor 140 through appropriate coupling means indicated by the numeral 154. The position of each of the gears 150, 151, 152, and 153 is directly proportional to the line of flight of the craft so that when the craft is increasing in altitude, and its angle of flight with respect to horizontal is greater than the horizontal, each of the gears 150, 151, 152, and 153 will be rotated in a clockwise direction so that their associated switching surfaces will be rotated in a counterclockwise direction. When these associated switching surfaces are moved in a counterclockwise direction the switch arms associated with the various surfaces will come in contact with the respective contacts at a point determined by the amount of counterclockwise rotation of the associated surfaces. This will mean that the area viewed on the oscilloscope 35 will be an area which has its center line above the true horizontal line and this line will correspond directly with the line of flight of the craft.

Should the aircraft be decreasing in altitude, the gears 150, 151, 152, and 153 will be rotating in a counterclockwise direction so that their associated switching surfaces will be rotated in a clockwise direction. This will mean that the area viewed by the oscilloscope 35 will be on an area whose center line is below the true horizon and this center line will still be the line of flight of the craft.

Next to be considered is the automatic control equipment which utilizes the indication of the presence of obstacles to cause automatic flight control equipment to avoid those obstacles. This automatic control equipment utilizes the output of the receiver 53 which is fed through a clipper 160 where the magnitude of all of the return signals indicating obstacles are clipped to a constant value. This clipper in turn feeds the control signal to a D. C. restorer 161. This restorer establishes a constant base line for the return signals. The output of the restorer 161 is fed through a filter network 162 which has an output load resistor 163. The voltage appearing across the resistor 163 will be a direct current voltage and will be of the magnitude dependent upon the area over which obstacles lie with respect to the line of flight of the craft. This will be more fully explained under the portion of the specification entitled "Operation."

A standard signal is derived from network 165 and this network includes a battery 166, a fixed resistor 167, and a variable resistor 168 which is mechanically connected to the clearance adjusting knob 45.

For indicating a difference in potentials existing across the resistors 163 and 167, a vibrator 170 has been provided. This vibrator consists of a vibrating arm 171 and a pair of contacts 172 and 173. The motivating force for the vibrating arm 171 is derived from a suitable energizer 174 which is connected to the common source of power, not shown. The output from the vibrator 170 is coupled to a transformer 175 to the input of an amplifier 176. This amplifier may also be of the type disclosed in the above mentioned patent to Albert P. Upton. The amplifier is of the phase discriminator type and is capable of reversibly energizing the control motor 177 in accordance with the phasing of the signal fed in on the input of the amplifier 176.

The motor 177 is operative to make adjustment in the automatic control equipment in the aircraft carrying the subject apparatus. This motor operates through appropriate gearing and a dash pot assembly 179 and this dash pot is so arranged that when there is a signal calling for an increase in altitude, a very fast adjustment can be made in the associated control networks but as soon as the input signal calling for a decrease in altitude, the dash pot will permit a relatively slow adjustment of the associated control networks back to the normal position. The reason for this will be outlined below.

The output of the dashpot assembly is used to position a slider 181 in the throttle control network 180 which is normally connected in series with a throttle control network of the type disclosed in the copending application of Alex B. Chudyk carrying Serial No. 659,649, filed April 4, 1946, now Patent No. 2,485,431. The dash pot assembly as driven by motor 177 also makes an adjustment in the elevator control of the craft as indicated generally by the numeral 185. This elevator control is associated with an apparatus for maintaining a constant altitude of the craft. Such an apparatus is fully disclosed in a copending application of Fred P. Strother, Serial No. 789,831, filed December 5, 1947. It will be sufficient to say here that the subject elevator control is arranged to maintain the craft at a constant altitude as determined by an altitude responsive bellows 186 which serves to position a slider 187 in an associated electrical network. Motor 177 acting through dash pot 179 serves to position a slider 188 over an associated slide-wire 189. When there is a signal calling for an increase in the line of flight of the craft, the slider 188 will be moved from its normal position at the right end of the slide-wire 189 across the slidewire toward the left. This movement will tend to decrease the controlling effect of the altitude responsive device 186 and to shift the electrical balance of the associated electrical network when measured between the slider 187 and the conductor 190 in a direction to call for an up elevator signal. The vertical gyroscope 191 acting along the pitch axis of the craft, tends to stabilize the control of the craft about a fixed reference point.

The dash pot 179, referring to Figure 10, may be seen to comprise a cylinder 192 with a piston 193 arranged for axial movement therein. This piston has a relatively large opening or aperture 194 therein, the latter of which has a spring biased valving member 195 covering the same. This valving member 195 has a further aperture 197 therein which is considerably smaller than the aperture in piston 193. The valving member is carried by a ported housing and connector 196. The cylinder 192 is filled with any suitable fluid so that movement of the piston may be restricted by the flow of the fluid from one side of the piston to the other. Piston 193 is arranged to be moved by the resilient coupling 198, the latter being moved by an output arm 199 of the gear train 178.

On some types of aircraft it has been found that the opening of the throttle of the aircraft will cause an increase in altitude and the craft will tend to maintain a constant air speed, while the giving of an up elevator signal in the same craft will tend to decrease the speed of the craft. With this in mind, it will be obvious that in order for a constant increase in altitude to be obtained it is necessary to make adjustments in both the throttle and the elevator control networks of the aircraft although either one might satisfy the requirements of a particular situation where only a small change needs to be accomplished.

Operation

Assume the craft carrying the subject apparatus is flying in the position that aircraft 15 is flying in Figure 2. As mentioned above, the line of flight of the craft corresponds to the true horizon. To correct for changes in the longitudinal axis of the craft, the vertical gyroscope acting through the angle of flight motor 140 serves to position the switching surfaces 66, 87, 82, and 91 so that their center line always corresponds to the true line of flight of the craft, which is horizontal in the condition assumed. With this, the antenna switch 90 is turning the transmitter 50 on when the antenna sweeps from the plus 90° position to the minus 90° position and this switching is accomplished by the slider 92 moving over the conducting surface 91 of the transmitter switch assembly 90. With the antenna rotating in a clockwise direction as shown, all of the associated switch arms are also rotating in a clockwise direction over their associated switching surfaces. As the switch arms are rotating clockwise, the various switch arms are providing operating voltages for the oscilloscope as well as the transmitter 50 and that the oscilloscope will be viewing an area of approximately 30° along the line of flight of the craft with approximately 15° above the line of flight and 15° below the line of flight.

With a received signal occurring to indicate the presence of obstacles within the viewing range of the scope, the picture viewed by the pilot would be substantially as that shown in Figure 3 where the illuminated area, as represented by the numeral 43, indicates the location of the obstacles with respect to the line of flight of the craft. The synchronizing signal or range gate signal fed into the receiver from the synchronizer 55 is effective to maintain the receiver operative for a length of time which will limit the range for receiving return signals to a maximum value. This may be adjusted to a value which will insure that the apparatus will have sufficient time to cause the craft to increase in altitude when an obstacle lies along its line of flight. Thus, if the range gate signal to the receiver is set at 15 miles and the clearance adjusting knob is set for a clearance of plus 6°, only obstacles lying at a range of 15 miles away and above a point 1,500 feet below the line of travel of the craft will be capable of causing the apparatus to come into operation. In understanding how the apparatus operates reference should be made to Figure 9A. Figure 9A shows graphically the signal that will be received from the receiver as the antenna rotates through 360 degrees of rotation starting the cycle at plus 90°. The shaded area 200 represents the presence of obstacles in front of the craft and is actually a square voltage wave as it appears on the output of resistor 161. In other words, as the antenna is rotating from plus 90° to minus 90° with respect to the line of flight of the craft obstacles will be detected and a square wave direct current voltage will appear on the output of restorer 161 and the leading edge of the wave 200, as identified by numeral 201, corresponds to the top of an obstacle detected which would be obstacle 20 for the aircraft 15 in Figure 2. As the antenna continues to rotate towards minus 90°, obviously the obstacles will be detected throughout the entire angle until a minus 90° position is reached at which time the transmitter is turned off. This square wave 200, appearing upon the output of the D. C. restorer 161, will be the voltage that is applied to the input of the filter 162.

As long as the line 201 which indicates the beginning of the obstacle, falls after the clearance adjusted line 202, the control apparatus will not operate to call for an increasing altitude. This will be understood by examining Figure 9B. In Figure 9B, the obstacle signal 200 has passed through the filter 162 and has been averaged out to an average direct current voltage and this voltage has been indicated by the numeral 204. The dotted line 205 represents the standard or clearance adjusted signal as determined by the position of the manual knob 45. As long as the voltage indicated by the numeral 205 is greater than the average voltage as indicated by the numeral 204, representing standard signal and obstacle signal respectively, there will be no control signal calling for an increase in altitude of the craft and no adjustment will be made in the control networks.

Referring now to Figure 9C, assuming that the aircraft 15 has moved toward the right and is now coming into the signal range of the obstacle 25 in Figure 2, there will be a change in the return signal from the receiver and the output of the D. C. restorer 161 will now be a direct current square wave of the same magnitude as before but of longer duration. This pulse 200, as shown in Figure 9C, then passes through the filter 162 of Figure 1 and a new average voltage will be had. This average voltage is represented by the line 204 in Figure 9D, and it will be noted in this case that the average voltage from the obstacle signal is now greater than the standard voltage as represented by the line 205. It will further be noted that the leading edge of the obstacle signal 201 has occurred before the clearance adjust point as represented by the line 202 which will mean that the apparatus will have to make an adjustment in the associated controls which will cause an increase in the altitude of the craft and the line of flight of the craft in order to avoid the obstacle lying along the line of the craft as indicated by the detecting apparatus.

Referring back to Figure 1, and assuming that the aircraft 15 is under consideration, as shown in Figure 2, the obstacles detected by the receiver will be fed through the clipper 160 and D. C. restorer 161 to the filter 162 where the signal will be averaged out and the output voltage from the filter appearing upon the load resistor 163 will correspond to the voltage represented by the line 204 in Figure 9B. With the adjusting knob 45 set at the 6° clearance adjust position, the standard voltage appearing across the resistor 167 will be the voltage represented by the dotted line 205 in Figure 9B. Since the voltage across resistor 167 is greater than the voltage across resistor 163, the vibrator 170 when vibrating between contacts 172 and 173 will have an alternating current output which will be calling for a decrease in the line of flight of the craft. This will mean that the motor 177, in operating through the gear train 178 and dash pot 179, will be maintaining the sliders 181 and 188 in their extreme right hand position where they will be ineffective to cause any control of the automatic controls of the craft.

As the craft 15 flies toward the right in Figure 2, obstacle 25 will come into range of the apparatus and the output signal from the receiver and restorer 161 will be the square voltage wave as represented by the voltage wave in Figure 9C. When this voltage wave is passed through the filter network 162, there will be a resultant direct current voltage upon the resistor 163 which will correspond to the voltage 204 as shown in Figure 9B. As the standard signal as represented by the line 205 in Figure 9B is still set at the same value, the voltage on 167 will be less than the voltage than the averaging circuit as appearing across resistor 163 and therefore the vibrator 170 will have an output voltage which will be opposite in phase the situation assumed previously and this output voltage phase will be of such phase as to cause the motor 177 to operate in a direction calling for an increase in altitude of the craft. This will mean that the motor 177, acting through gear train 178 and dash pot 179, will move the sliders 181 and 188 across their associated slide-wires to unbalance the associated electrical networks to call for an increase in the throttle opening and for an up elevator signal in networks 180 and 185 respectively. It will be seen, in Figure 10, that as the gear train 178, acting through lever 199 and resilient coupling 198, moves the piston 193 to the right there will be little restriction to this movement since the valve member 195 will unseat itself so that the fluid on the right side of the piston will flow to the left side with little difficulty. This will mean there can be a relatively fast adjustment made of this slider of the associated potentiometer by the motor 177, the dash pot providing no appreciable restriction or delay in the adjustment.

The aircraft will now start increasing in altitude and will continue to increase in altitude as long as the averaging signal appearing across the resistor 163 is greater than that appearing across the standard resistor 167.

As soon as the line of flight of the craft is such as to indicate that the desired angle of clearance will be maintained, the average signal appearing across resistor 163 will be equal to the standard signal appearing across the resistor 167 and there will be no output from the vibrator into the amplifier 176 and therefore the motor 177 will maintain its position until a further signal is received from the vibrator 170. This position will correspond, for example, to the position shown by the aircraft 26 in Figure 2. In other words, the projected line of flight of the craft as indicated by the numeral 27 is sufficient to maintain the desired clearance angle 29 between the line of flight line 27 and the obstacle line 28.

As the craft continues along its projected line of flight, the obstacle will begin to drop below the craft and this will mean that the average voltage appearing across the averaging resistor 163 will become less than the voltage appearing across the resistor 167. The vibrator 170 will now have an output voltage which is phased to call for a decrease in altitude of the craft and this will start the motor 177 rotating in the opposite direction to move the sliders 181 and 188 back to their normal position. To prevent the readjustment of the sliders 181 and 188 back to their initial positions as quickly as they were moved from those end positions, the dash pot 179 is provided. This dash pot tends to maintain the sliders in position where they were adjusted by the motor 177 as it was calling for an increase in altitude and tends to oppose any adjustment moving the sliders toward their initial position. However, a slow adjustment can be made of these sliders. The slow adjustment will be made because the motor 177 when driving its gear train 178 and the resilient coupling 198 in the opposite direction will cause the valve member 195 to reseat itself so that the only passage for fluid between the left side and the right side of the piston will be through the small aperture 197 which gives considerable restriction to the fluid flow and therefore restriction to the leftward movement of the piston.

The reason for the dash pot will be understood when it is noted that the apparatus is not sensitive to the range of an obstacle from an aircraft and therefore it would tend to maintain only a predetermined angle of clearance with respect to obstacles lying along the line of flight of the craft. Thus, as the range between the craft and the obstacle decreased, while the angle of clearance would be maintained, the actual clearance in terms of distance would decrease and the apparatus would tend to bring the craft down directly on top of the obstacle. The dash pot is so arranged that the sliders 181 and 188 cannot be moved back to their initial positions until a safe distance has been passed.

Thus, with the dash pot 179, the apparatus will quickly call for an increase in altitude and will slowly wipe off the increasing altitude signal until the craft has cleared the obstacle by a safe distance. When a safe distance has been traversed, the sliders will be back in their initial position. As soon as the sliders are back in their initial positions, the apparatus will fly in accordance with the automatic controls which control the position of the throttle and the elevator.

*Figure 5*

Referring now to Figure 5, here is shown a modification of the manner in which the returning obstacle signal from the receiver is utilized to control the motor 177. The apparatus associated with this figure corresponds identically to that of Figure 1 as concerns the transmitting and receiving unit and the coordinating unit for obtaining the signals for the associated oscilloscope. In this case, however, the motor, which is driving the shaft 61 which is connected to the antenna assembly 57, shown in Figure 1, drives the antenna assembly relatively slow as compared to the speed at which the antenna was rotating in Figure 1. Also provided with the apparatus in addition to the equipment provided for the apparatus in Figure 1 is a further switching disc 155 which disc includes a pair of arcuate contact sectors 156 and 157. A contacting slider is associated with these sectors and carries the numeral 158. The slider 158 is connected directly to the shaft 61 which is driving the antenna assembly. For maintaining the switching disc 155 at a predetermined position with respect to the line of flight of the aircraft, an additional adjusting gear 159 is provided and this gear is operatively connected to the shaft 154 which in turn is positioned by the angle of flight motor 140, as shown in Figure 1. The vibrator 170, the transformer 175, amplifier 176 and motor 177 all correspond to components shown in Figure 1. Also provided is the standard battery 166, the adjusting resistor 168 and the standard resistor 167 as well as the load resistor 163 associated with the obstacle signal. In the present figure, the output of the restorer 161 is fed in through a filter network 195, which filter network does not average out the obstacle signal as occurred when the filter 162 was utilized in Figure 1.

Considering the operation of the apparatus shown in Figure 5, it will first be considered in respect to the obstacle signal returning from the receiver to the restorer 161. It will be recalled that the obstacle signal occurring on the output of the restorer 161 is actually a square wave as is shown in Figure 9A and 9C. This square wave is applied, in the present modification, directly to the filter 195 and since this filter is present only to eliminate transients existing in the square wave shown in Figures 9A and 9C, the output wave appearing upon the load resistor 163 will be a square wave substantially as shown in Figures 9A and 9C. In other words, as soon as an obstacle is detected, a square wave of a fixed voltage will appear upon resistor 163 and will remain there until the antenna has reached the minus 90 degree position and the transmitter is shut off, as is shown and as has been explained in connection with Figure 1.

It will be noted that the slider 158 moves in a clockwise direction in the same manner as the sliders associated with the other switching discs shown in Figure 1. When this arm 158 is rotating clockwise, as soon as the arm strikes the contact sector 156, an electrical circuit is completed between the transformer 175 and the amplifier 176. This circuit may be traced from the upper terminal of the secondary of transformer 175 through conductor 210, conductor 211, switch arm 158, sector 156, conductor 212, to the amplifier 176. From this it will be seen that the only time the amplifier 176 is connected to check on the obstacle signal is when the transmitter is operating. This will prevent any hold over signal on the filter 195 causing a false operation of the apparatus in a manner that will be understood from the discussion that follows. As the arm 158 continues to rotate clockwise, it will eventually contact the sector 157 at which time an electrical circuit will be completed in the standard battery circuit. This circuit may be traced to the lower terminal of battery 166 through conductor 213, sector 157, slider 158, conductor 211, ground 214, ground 215, and resistors 167 and 168 back to the upper terminal of battery 166. In other words, as soon as the slider 158 contacts the switching sector 157, a voltage will be applied to the resistor 167 and the magnitude of this voltage will depend upon the setting of the resistor 168. In the present situation, the magnitude of the voltage across the resistor 167 is set by the resistor 168 to be equal to the magnitude of the obstacle signal which appears across the resistor 163. Thus, with an obstacle signal appearing on resistor 163 and a standard signal appearing upon the resistor 167, there will be no output from the vibrator 170 to the transformer 175 to the amplifier.

Assume now that the craft carrying the apparatus carries the modification shown in Figure 5 and is flying as craft 15 is shown in Figure 2. When in the position shown in Figure 2, the antenna will be detecting a signal as indicated in Figure 9A and this signal will be appearing upon the output of the restorer 161 and also upon the load resistor 163 with the leading edge 201 occurring at an angular position of the antenna corresponding to that shown in Figure 9A. In Figure 9A the line 202 represents the time at which the slider 158 will engage switch sector 157 and this will determine the angle of clearance to be obtained from the present modification. In other words, the position at which the slider 158 engages the sector 157 will determine the angular clearance of the subject apparatus. To change the clearance adjustment in the modification, it is necessary to change the switching sector 157; thus, to increase the angle of clearance it is necessary to decrease the size of the sector and to decrease the angle of clearance it is necessary to increase the length of the sector 157. Assuming that the slider 158 does engage the sector 157 at the position 202, as shown in Figure 9A, it will be noted that the circuit for the standard battery 166 will be completed at a short interval prior to the occurrence of the obstacle signal as indicated by the leading edge thereof 201. As soon as the standard signal appears across the resistor 167, there will be an output voltage from the vibrator 170 and this will be of a phase calling for a decrease in altitude. As soon as the obstacle signal is detected, the voltage appearing across the resistor 163 will correspond to that appearing across resistor 167 and there will be no output from the vibrator 170. This will mean that there will be no output signal from the vibrator until after the antenna has rotated to the minus 90° position at which time the arm 158 will have moved out of contact with the sectors 156 and 157 and the amplifier 176 will be desensitized and there will be no further standard signal appearing across the resistor 167. Thus, there will be no signal occurring on the output until the antenna is again in the position wherein the arm 158 will engage sector 157 and an obstacle signal is not detected until after this arm 158 engages sector 157.

Assume now that the craft 15, shown in Figure 2, is moved toward the right so that the obstacle 25 has come into the range of the apparatus. When this occurs, the top of the obstacle will be above the line of flight of the craft and therefore the output signal from the receiver which will appear upon the resistor 163 will be that as shown in Figure 9C with the leading edge of the obstacle signal appearing at 201. Referring still to Figure 9C, since the arm 158 will not engage the sector 157 until it reaches the position indicated by the line 202, it will be obvious that the obstacle signal will be appearing upon the resistor 163 before there is a corresponding voltage appearing upon the resistor 167 from the standard battery 166. When this occurs, referring to Figure 5, there will be an output detected by the vibrator 170 and the phase of this output will be in a direction to cause the amplifier to drive the motor 177 in a direction to cause increasing altitude adjustments in the throttle and elevator control networks, as shown in Figure 1. As soon as the arm 158 engages sector 157 there no longer will be an output signal from the vibrator and the motor 177 will remain stationary. Thus, as the antenna rotates, a small amount of adjustment will occur each time the antenna indicates an obstacle occurring at a position above the clearance angle as determined by the length of the sector 157.

As soon as the obstacle falls below the angle as determined by the length of the sector 157, the apparatus will tend to operate in the opposite direction when the arm 158 engages sector 157 before an obstacle signal appears upon the load resistor 163. Thus the motor 177 will tend to rotate back to its initial position and the craft will be restored to the normal control network for the throttle and the elevator. The movement back will be delayed by the dash pot shown in Figure 1.

Inasmuch as the antenna, in the modification shown in Figure 5, is rotating relatively slowly, it is believed advisable to provide a further arrangement where there is an antenna continuously operating through the area that is scanned along the line of flight of the craft. Such an arrangement is shown in Figure 7 where the counterbalance 59 of the antenna 57, shown in Figure 1, has been replaced by a further radiating assembly. Thus, as shown in Figure 7, the antenna 225 has two radiating assemblies 227 and 288, 180° displaced from each other, with the entire assembly being mounted upon a suitable pedestal 226. In this case, it is necessary that an antenna switching arrangement be provided within the pedestal 226 which will direct the energy from the transmitter to the antenna then in the radiating position and the antenna on the nonradiating position will be inoperative. With this arrangement, it is necessary to arrange the control circuits for the oscilloscope 35, shown in Figure 1, to be operative each time that the area is scanned by either the device 227 or 228. To accomplish this, one switching disc 231 has been shown and associated with the switching disc is an arm 230 which, instead of having a single projection as before it has two projections 180 degrees apart so that as the arm 230 rotates in a clockwise direction, the arm will intersect the switching sector 232 and 180 degrees later the other portion of the arm 230 will intersect the sector 232. Such modification is also required of the other arms associated with the vertical sweep circuits, the marker circuit and the amplifier and standard circuits.

This arrangement shown in Figure 7, therefore, would be operative twice as often as the arrangement shown in either Figures 1 and 5 and this arrangement may be employed with either of the apparatuses shown in Figures 1 or 5.

Referring now to Figure 8, there is shown one way in which the antenna of the subject apparatus may be designed. In some instances, it is desired that there be one main lobe on the antenna radiation pattern which is relatively narrow and a pair of side lobes which are relatively weak when compared with the main lobe. The side lobes are arranged so that their sensitivity will be effective to indicate a return signal from an obstacle lying only within a few hundred feet of the craft. The reason for designing side lobes into the apparatus will readily be seen by examining Figure 8 where an aircraft 250 is shown approaching an obstacle 251 and, its projected line of flight indicates that it will maintain a clearance over the obstacle 251. Inasmuch as the apparatus of the present invention is not range sensitive, it is desired that a signal be given to the apparatus when an obstacle lies within a predetermined range with respect to the craft so that the craft will be caused to fly upward if that distance is a dangerous distance. With this, as soon as the side lobe 252 strikes the obstacle 251, there will be a return signal to the apparatus even though the main lobe 253 is not indicating any return signal. Inasmuch as the return signal for the receiver due to the lobe 252 is no different than that of the main lobe 253, if the side lobe 252 indicates an obstacle lying within a predetermined range of the craft there will be a signal calling for an increase in altitude in the apparatus. Thus, the use of the side lobe 252 gives an added safety factor to the apparatus and will tend to maintain the apparatus calling for an increasing altitude if the obstacle over which the craft is flying is within a predetermined distance.

As soon as the obstacle 251 has been cleared by a safe distance, the side lobe 252 will no longer be effective because of its relative weakness and only the main lobe 253 will be controlling the operation of the apparatus, unless the clearance over further obstacles along the line of flight of the craft lie within the distance required for the side lobe 252 to be effective. The other side lobe 254 will not be effective since, as soon as the main lobe 253 is moved to the minus 90° position, the transmitter will be shut off. In designing an antenna to have the desired main and side lobes, reference may be made to "Principles of Radar" by the staff of the M. I. T. Radar School, the Technology Press, 1944, chapter 9, article 32.

From the foregoing it will be seen that I have provided an apparatus for determining the presence of obstacles along the line of flight of an aircraft and this apparatus will cause the aircraft to increase its line of flight and altitude to avoid those obstacles if those obstacles fall within a predetermined position with respect to the line of travel of the craft. Further, I have provided an apparatus which will respond quickly to the presence of an obstacle and cause the craft to increase in altitude and will slowly return the craft to its automatically controlled position as soon as the obstacle has been cleared. While I have shown specific embodiments of my invention, it will be obvious to those skilled in the art that many modifications are readily apparent in the foregoing description and therefore I intend to be limited solely by the scope of the appended claims.

I claim as my invention:

1. Apparatus for controlling a craft having automatic steering controls, comprising in combination, electric object locating apparatus for detecting the presence of obstacles in the path of the craft, said apparatus comprising a signal radiating and receiving device rotating in a vertical plane, automatically operative means maintaining said apparatus operative through a predetermined angle of operation with respect to the line of travel of the craft, said means comprising a device responsive to the angle of climb or descent of the craft, signal sensing means connected to said apparatus having an output voltage, motor means controlled by said output voltage, and means including said motor means for affecting the steering controls, when said sensing means has an output voltage indicative of the presence of an obstacle on the line of travel of the craft, to modify the line of travel of the craft so as to avoid the obstacle.

2. Apparatus for controlling a craft having automatic steering controls for maintaining a normal line of travel and an electric object locating device, comprising in combination, sensing means adapted to be connected to the output of the locating device having an output signal indicative of the presence of obstacles along the path of travel of the craft, motor means, means connecting said motor means to said sensing means so that said motor means is controlled by said sensing means in accordance with the output signal of said sensing means, and means including said motor means for affecting continuous operation of the steering controls when said sensing means indicates the presence of an obstacle along the path of travel of the craft, said means including dash pot means for effecting fast response when an obstacle is detected along said path and slow response only after an obstacle has been passed and the apparatus is returning to normal.

3. Terrain clearance apparatus for an automatically controlled craft comprising in combination, a signal radiating and receiving device for indicating the presence of terrain along the line of travel of the craft, said device rotating only in a vertical plane about a horizontal axis which is perpendicular to the line of travel of the craft, circuit means for energizing said device to be operative through a predetermined angle of movement in the vertical plane on either side above and below the actual line of travel of the craft, said device when operative having a signal output proportional to the configuration of the terrain along the path of travel with respect to the line of travel of the craft, a standard signal, sensing means, said sensing means comparing said standard signal and the signal from said device, motor means controlled by said sensing means, and means including said motor means for modifying the line of travel of the craft when said sensing means indicates a difference between said signal and said standard which is indicative of the presence of terrain along the line of travel of the craft.

4. Terrain clearance apparatus for an automatically controlled craft, comprising in combination, a signal radiating and receiving device for indicating the presence of terrain along the line of travel of the craft, said device rotating only in a vertical plane about a horizontal axis which is perpendicular to the line of travel of the craft, circuit means for energizing said device to be operative through a predetermined angle of movement in the vertical plane on either side of the actual line of travel of the craft, said device when operative having a signal output proportional to the configuration of the terrain along the path of travel of the craft with respect to the line of travel of the craft, averaging means for converting said signal into a voltage which is proportional to the configuration of the terrain, a standard signal, comparison means for indicating the deviations between said voltage and said standard signal connected to said averaging means and said standard signal, motor means controlled by said comparison means, said motor means adapted to continuously modify the line of travel of the craft when said voltage deviates from said standard signal in a predetermined direction indicating a need for a change in the line of travel of the craft.

5. Apparatus for use with an automatically controlled craft having a device for detecting obstacles along the line of travel of the craft, comprising in combination, sensing means for detecting the output of the detecting device, said sensing means having an output signal proportional to the magnitude of the obstacles along the actual line of travel of the craft, and control means continuously connected to said sensing means operated relatively quickly when the magnitude of said signal exceeds a predetermined value and relatively slowly when said signal is less than said predetermined value, said control means being adapted to continuously cause said craft to increase its angle of line of travel with respect to horizontal relatively quickly until said predetermined value is no longer exceeded and then returning the craft to normal line of travel relatively slowly.

6. Apparatus for controlling a craft having automatic steering controls, comprising in combination, an electric object locating device, sensing means connected to said device for indicating the presence of obstacles, motor means controlled by said sensing means, and means including said motor means for continuously affecting the steering apparatus in a predetermined manner when said sensing means indicates an obstable along the actual line of travel of the craft so as to cause the craft to avoid the obstacle, said last named means comprising means for effecting relatively fast adjustment of the steering controls when an obstacle is being avoided and relatively slow adjustment back to normal when the craft is clear of the obstacle.

7. Apparatus for controlling an aircraft having automatic power control apparatus, comprising in combination, an object locator comprising an electric detecting system, means sensing the output of said locator having a signal output indicative of the presence of obstacles along the path of travel of the craft, motor means connected to said sensing means and controlled thereby, unidirectionally effective damping means comprising a device which is arranged so that when moved in one direction the movement is transmitted therethrough directly and without delay and when moved in the opposite direction the movement transmitted therethrough is delayed, and means connecting said last named means in a connection between said power control apparatus and said motor, said motor and damping means effecting direct adjustment of said power control apparatus when said sensing means indicates the presence of an obstacle along the path of the craft with movement of said damping means in said one direction and damping the adjustment of said power control apparatus following said direct adjustment when obstacles are no longer along the path of travel of the craft with movement of said damping means in said opposite direction.

8. Apparatus for causing an aircraft with automatic flight control apparatus to avoid obstacles along the path of travel of the craft, comprising in combination, an electric object locating apparatus, sensing means connected to said locating apparatus, said sensing means having a signal output indicative of the presence of obstacles along the path of travel of the craft, motor means connected to said sensing means and controlled thereby, means including said motor means arranged for connection to the flight control apparatus to cause the craft to change its line of flight when said sensing means indicates the presence of an obstacle along said path, gravity sensitive means, viewing means connected with said detector to give a visual display of obstacles within predetermined angles with respect to the line of flight of the craft, means including said sensitive means for indicating on said viewing means true horizon, and a device combining signals indicative of rate of vertical change of altitude and forward speed connected to said viewing means to establish line of flight with respect to said obstacles and horizon.

HENRY L. HANSON.

REFERENCES CITED

The following references are of record in the file of this patent:

UNITED STATES PATENTS

| Number | Name | Date |
|---|---|---|
| 2,268,587 | Guanella | Jan. 6, 1942 |
| 2,372,620 | Williams | Mar. 27, 1945 |
| 2,406,953 | Lewis | Sept. 3, 1946 |
| 2,412,003 | Neufeld | Dec. 3, 1946 |
| 2,424,193 | Rost et al. | July 15, 1947 |
| 2,448,007 | Ayres | Aug. 31, 1948 |
| 2,450,991 | Sanders | Oct. 12, 1948 |
| 2,457,393 | Muffly | Dec. 28, 1948 |
| 2,499,349 | Ayres | Mar. 7, 1950 |

FOREIGN PATENTS

| Number | Country | Date |
|---|---|---|
| 520,778 | Great Britain | May 3, 1940 |